US007079953B2

(12) United States Patent
Thorne et al.

(10) Patent No.: US 7,079,953 B2
(45) Date of Patent: Jul. 18, 2006

(54) METHOD FOR CREATING FACIES PROBABILITY CUBES BASED UPON GEOLOGIC INTERPRETATION

(75) Inventors: Julian Arthur Thorne, Benicia, CA (US); Marjorie E. Levy, Danville, CA (US); Andrew William Harding, Danville, CA (US); Deyi Xie, San Ramon, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 105 days.

(21) Appl. No.: 10/923,346

(22) Filed: Aug. 20, 2004

(65) Prior Publication Data

US 2006/0052938 A1 Mar. 9, 2006

(51) Int. Cl.
G01V 1/28 (2006.01)
(52) U.S. Cl. ........................................................ 702/16
(58) Field of Classification Search .................. 702/14, 702/16, 17; 703/10; 367/73
See application file for complete search history.

(56) References Cited

U.S. PATENT DOCUMENTS

| 5,475,589 | A | | 12/1995 | Armitage |
| 5,838,634 | A | | 11/1998 | Jones et al. |
| 5,999,485 | A | | 12/1999 | Anstey et al. |
| 6,014,343 | A | * | 1/2000 | Graf et al. ............. 367/38 |
| 6,018,497 | A | * | 1/2000 | Gunasekera .......... 367/72 |
| 6,018,498 | A | * | 1/2000 | Neff et al. ............ 367/72 |
| 6,035,255 | A | | 3/2000 | Murphy et al. |
| 6,044,328 | A | | 3/2000 | Murphy et al. |
| 6,070,125 | A | | 5/2000 | Murphy et al. |
| 6,106,561 | A | * | 8/2000 | Farmer ................. 703/10 |
| 6,138,076 | A | * | 10/2000 | Graf et al. ............ 702/14 |
| 6,295,504 | B1 | | 9/2001 | Ye et al. |
| 6,438,493 | B1 | | 8/2002 | West et al. |
| 6,477,469 | B1 | | 11/2002 | Ye et al. |
| 6,480,790 | B1 | | 11/2002 | Calvert et al. |
| 6,560,540 | B1 | | 5/2003 | West et al. |
| 6,850,864 | B1 | * | 2/2005 | Gillard et al. ......... 702/156 |
| 2002/0042677 | A1 | | 4/2002 | West et al. |

(Continued)

OTHER PUBLICATIONS

Clayton V. Deutsch et al., Hierarchical Object-Based Stochastic Modeling of Fluvial Reservoirs, Modeling of Fluvial Reservoirs, 1996 International Association for Mathematical Geology, Mathematical Geology, vol. 28, No. 7, 1996, pp. 857-880.

(Continued)

*Primary Examiner*—Donald McElheny, Jr.
(74) *Attorney, Agent, or Firm*—Richard J. Schulte

(57) ABSTRACT

A method for creating a facies probability cube is disclosed. A S-grid containing facies is first created. The grid includes layers of cells and columns of cells. Vertical facies proportion data for the layers of cells is derived from sources such as well data, conceptual vertical geologic sections and graphs describing the proportion of facies found in each of the layers. Areal depocenter maps are created which have defined boundaries to create depocenter regions in which respective facies are likely to occur. Ideally, the boundaries for the depocenter regions for each of the facies are sequentially and independently defined. Horizontal or map facies proportion data are generated for the columns of cells preferably by filtering the depocenter regions so that the proportion of each of the facies ranges from a maximum value to a minimum value. The vertical and horizontal facies proportion data are then integrated to create a facies probability cube in which the cells are assigned probabilities for the occurrence of facies.

16 Claims, 14 Drawing Sheets

U.S. PATENT DOCUMENTS

2002/0183932 A1 12/2002 West et al.
2004/0008891 A1 1/2004 Wentland et al.
2004/0068378 A1 4/2004 Schuette
2004/0210547 A1 10/2004 Wentland et al.

OTHER PUBLICATIONS

Jef Caers et al., Stochastic Integration of Seismic Data and Geologic Scenarios: A West Africa Submarine Channel Saga, The Leading Edge, Mar. 2003, Interpreter's Corner, Coordinated by Rebecca Buxton Latimer.

S.F. Carle, Use of a Transition Probability/Markov Approach to Improve Geostatistical Simulation of Facies Architecture, U.S. Department of Energy, Lawrence Livermore National Laboratory, Nov. 1, 2000, Preprint UCRL-JC-141551, pp. 1-4.

Sebastien Strebelle, Conditional Simulation of Complex Geological Structures Using Multiple-Point Statistics[1], 2002 International Association for Mathematical Geology, Mathematical Geology, vol. 34, No. 1, Jan. 2002, pp. 1-21.

Jef Caers et al., Geostatistical Integration of Rock Physics, Seismic Amplitudes and Geological Models in North-Sea Turbidite Systems, 2001, Society of Petroleum Engineers, Inc., SPE 71321.

Sebastien B. Strebelle et al., Reservoir Modeling Using Multiple-Point Statistics, 2001, Society of Petroleum Engineers, Inc., SPE 71324, pp. 1-11.

Sebastien Strebelle et al., Modeling of a Deepwater Turbidite Reservoir Conditional to Seismic Data Using Multiple-Point Geostatistics, 2002, Society of Petroleum Engineers, Inc., SPE 77425, pp. 1-10.

C. Ravenne et al., Chapter 2, Quantification of Facies Relationships Via Proportion Curves, 2002 Kluwer Academic Publishers, pp. 19-39.

Thomas T. Tran, Improving Variogram Reproduction on Dense Simulation Grids, 1994 Multiple Grid, pp. 1161-1168.

A. G. Journel[2], Combining Knowledge From Diverse Sources: An Alternative to Traditional Data Independence Hypotheses[1], 2002 International Association for Mathematical Geology, Mathematical Geology, vol. 34, No. 5, Jul. 2002, Marchand and Whitehead, pp. 573-597.

* cited by examiner

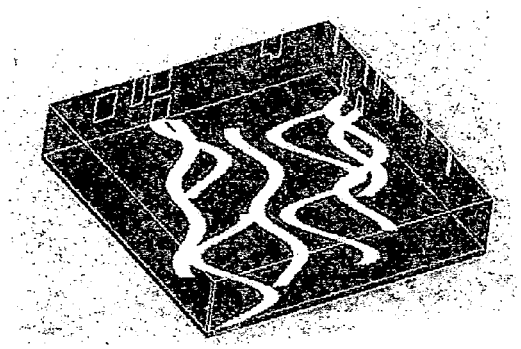
FIG. 4A
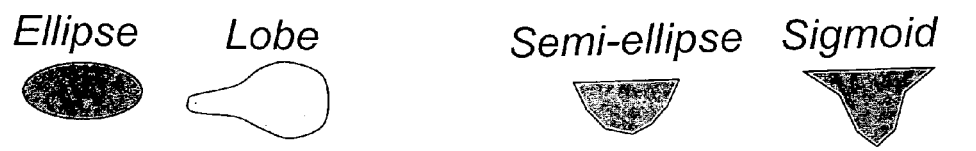
FIG. 4B
FIG. 4C
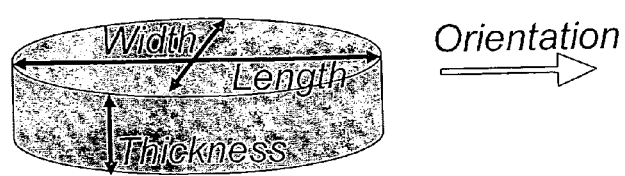
FIG. 4D
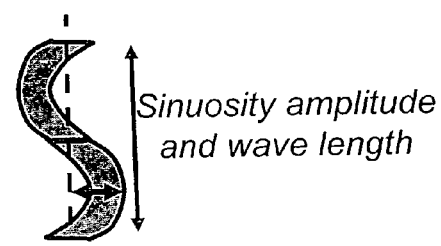
FIG. 4E

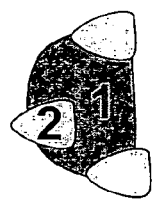 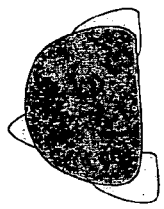 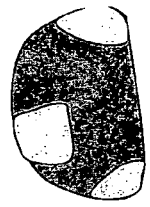
FIG. 5A  FIG. 5B  FIG. 5C
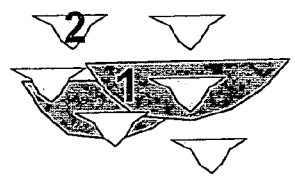 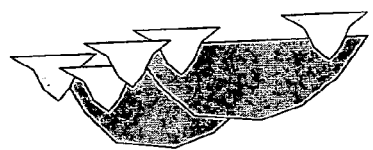 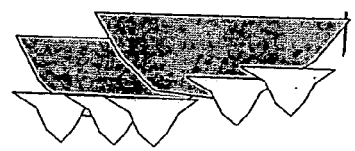
FIG. 6A  FIG. 6B  FIG. 6C

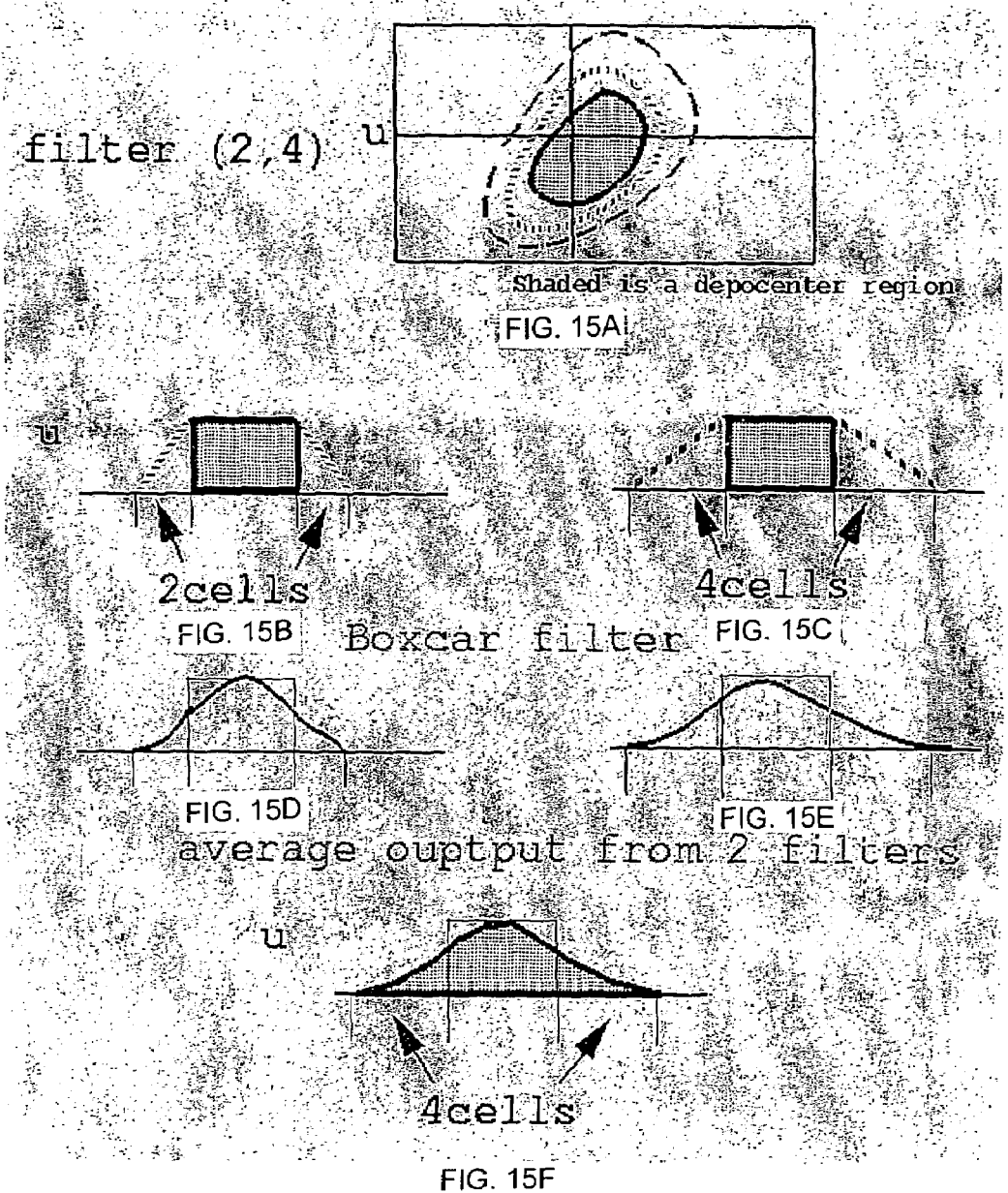

WEIGHTED PROPORTION GRAPH FOR MINIMAL FACIES PROPORTION FACIES A

| Layer | Proportion Facies A | Proportion Facies B | Proportion Facies C |
|---|---|---|---|
| 1 | 0.0 | 0.0 | 1.0 |
| 2 | 0.0 | 0.0 | 1.0 |
| 3 | 0.0 | 0.4 | 0.6 |
| 4 | 0.0 | 0.8 | 0.2 |
| 5 | 0.0 | 0.8 | 0.2 |
| 6 | 0.0 | 1.0 | 0.0 |
| 7 | 0.0 | 1.0 | 0.0 |
| 8 | 0.0 | 1.0 | 0.0 |
| 9 | 0.0 | 1.0 | 0.0 |
| 10 | 0.0 | 1.0 | 0.0 |
| 11 | 0.0 | 1.0 | 0.0 |
| 12 | 0.0 | 1.0 | 0.0 |
| 13 | 0.0 | 1.0 | 0.0 |
| 14 | 0.0 | 1.0 | 0.0 |
| 15 | 0.0 | 1.0 | 0.0 |
| 16 | 0.2 | 0.8 | 0.0 |
| 17 | 0.4 | 0.6 | 0.0 |
| 18 | 0.4 | 0.6 | 0.0 |
| 19 | 1.0 | 0.0 | 0.0 |
| 20 | 1.0 | 0.0 | 0.0 |

FIG. 18

METHOD FOR CREATING FACIES PROBABILITY CUBES BASED UPON GEOLOGIC INTERPRETATION

CROSS-REFERENCE TO RELATED PATENT APPLICATIONS

This application incorporates by reference all of the following co-pending applications:

"Method for Making a Reservoir Facies Model Utilizing a Training Image and a Geologically Interpreted Facies Probability Cube," Ser. No. 10,923,316, filed herewith.

"Multiple-Point Statistics (MPS) Simulation with Enhanced Computational Efficiency," Ser. No. 10/923,336, filed herewith.

FIELD OF THE INVENTION

The present invention relates generally to methods for constructing reservoir facies models, and more particularly, to methods for creating facies probability cubes to be used in geostatistical simulations to create reservoir facies models.

BACKGROUND OF THE INVENTION

Reservoir flow simulation typically uses a 3D static model of a reservoir. This static model includes a 3D stratigraphic grid (S-grid) commonly comprising millions of cells wherein each individual cell is populated with properties such as porosity, permeability, and water saturation. Such a model is used first to estimate the volume and the spatial distribution of hydrocarbons in place. The reservoir model is then processed through a flow simulator to predict oil and gas recovery and to assist in well path planning.

In petroleum and groundwater applications, realistic facies modeling, prior to porosity, permeability, and water saturation modeling, is critical to make realistic flow performance predictions that will enable identifying new resource development opportunities and make appropriate reservoir management decisions such as new well drilling. Current practice in facies modeling is mostly based on variogram-based simulation techniques. A variogram is a statistical measure of the correlation between two spatial locations in a reservoir. A variogram model is usually inferred from well data.

These variogram-based simulation techniques are known to give to a modeler a very limited control on the continuity and the geometry of simulated facies. The techniques may provide reasonable predictions of the subsurface architecture in the presence of closely spaced and abundant data, but they usually fail to adequately model reservoirs with sparse data collected at a limited number of wells. This is commonly the case, for example, in deepwater exploration and production where, in general, variogram-based models display much more stochastic heterogeneity than expected from the conceptual depositional models provided by geologists.

A more recent modeling approach, referred to as multiple-point statistics simulation, or MPS, has been proposed by Guardiano and Srivastava, *Multivariate Geostatistics: Beyond Bivariate Moments: Geostatistics-Troia,* in Soares, A., ed., Geostatistics-Troia: Kluwer, Dordrecht, V. 1, p. 133–144. (1993). MPS simulation is a reservoir facies modeling technique that uses conceptual geological models as 3D training images to generate geologically realistic reservoir models. Reservoir models utilizing MPS methodologies have been quite successful in predicting the likely presence and configurations of facies in reservoir facies models.

Numerous others publications have been published regarding MPS and its application. Caers, J. and Zhang, T., 2002, *Multiple-point Geostatistics: A Quantitative Vehicle for Integrating Geologic Analogs into Multiple Reservoir Models,* in Grammer, G. M et al., eds., Integration of Outcrop and Modern Analog Data in Reservoir Models: MPG Memoir. Strebelle, S., 2000, *Sequential Simulation Drawing Structures from Training Images:* Doctoral Dissertation, Stanford University. Strebelle, S., 2002, *Conditional Simulation of Complex Geological Structures Using Multiple-Point Statistics:* Mathematical Geology, V. 34, No. 1. Strebelle, S., Payrazyan, K., and J. Caers, J., 2002, *Modeling of a Deepwater Turbidite Reservoir Conditional to Seismic Data Using Multiple-Point Geostatistics,* SPE 77425 presented at the 2002 SPE Annual Technical Conference and Exhibition, San Antonio, September 29–October 2. Strebelle, S. and Journel, A, 2001, *Reservoir Modeling Using Multiple-Point Statistics:* SPE 71324 presented at the 2001 SPE Annual Technical Conference and Exhibition, New Orleans, September 30–October 3. Training images used in MPS simulation describe geological structures believed to be present in the subsurface. The training images do not carry any spatial information of the actual field; they only reflect a prior geological conceptual model. Traditional object-based algorithms, freed of the constraint of data conditioning, can be used to generate such images. MPS simulation consists then of extracting patterns from the training image, and anchoring them to local data, i.e. well logs. Incorporating geological interpretation into reservoir models, as performed by MPS simulation using training images, is particularly important in areas with few drilled wells.

A paper by Caers, J., Strebelle, S., and Payrazyan, K., *Stochastic Integration of Seismic Data and Geologic Scenarios: A West Africa Submarine Channel Saga,* The Leading Edge, March 2003, describes how seismically-derived facies probability cubes can be used to further enhance conventional MPS simulation in creating reservoir facies models. A probability cube is created which includes estimates of the probability of the presence of each facies for each cell of the stratigraphic grid. These probabilities, along with information from training images, are then used with a particular MPS algorithm, referred to as SNESIM (Single Normal Equation Simulation), to construct a reservoir facies model.

The aforementioned facies probability cube was created from seismic data using a purely mathematical approach, which is described in greater detail in a paper to Scheevel, J. R., and Payrazyan, K., entitled *Principal Component Analysis Applied to 3D Seismic Data for Reservoir Property Estimation,* SPE 56734, 1999. Seismic data, in particular seismic amplitudes, are evaluated using Principal Component Analysis (PCA) techniques to produce eigenvectors and eigenvalues. Principal components then are evaluated in an unsupervised cluster analysis. The clusters are correlated with known properties from well data, in particular, interpreted facies, to estimate properties in cells located away from wells. The facies probability cubes are derived from the clusters.

Both variogram-based simulations and the MPS simulation utilizing the seismically-derived facies probability cubes share a common shortcoming. Both simulations methods fail to account for valuable information that can be provided only by geologist/geophysicist's interpretation of the reservoir's geological setting based upon their knowledge of the depositional geology of the region being modeled. This information, in conjunction with core and seismic data, can provide important information on the reservoir architecture and the spatial distribution of facies in a reservoir model.

Probability cubes are also known which, rather than being mathematically derived from seismic data, rely primariliy upon geological interpretation and conceptualization. Examples of commercial facies modeling programs include PETREL®, ROXAR® and HERESIM® programs. The PETREL® program is available from Technoguide AS Corporation of Oslo, Norway. The ROXAR® software is sold by ROXAR ASA Public Limited Company of Stavanger, Norway. The HERESIM® program is available from Institut Francais du Petrole of Cedex, France.

These programs typically combine vertical facies trend information with map or horizontal facies trend informaton to create facies cubes. In some instances, such as with ROXAR®, a modeler inputs equations to describe the probability of finding facies in a vertical section or else in a horizontal or map section or 3D of a model. Alternatively, in other commercial programs such as PETREL®, a modeler may directly digitize a facies probability map wherein the modeler attempts to simultaneously account for the competing presence of all facies in a single map.

Making simultaneous estimates of facies locations and probabilities that are highly dependent upon one, either through digitization or through estimating equations, are complex and challenging. Such methods make it difficult to rapidly create numerous probability cubes based on different geologic interpretations and assumptions of how the facies are distributed in a S-grid. Furthermore, algorithms used to combine vertical and map facies trend information to produce facies probability cubes can produce less than optimal estimates of the probabilities. The present invention addresses these shortcomings in making such facies probability cubes.

SUMMARY OF THE INVENTION

A method for creating a facies probability cube is disclosed. First, a S-grid is created which is representative of a subsurface volume containing facies. The grid includes layers and columns of cells. Vertical facies proportion data for the layers of cells are determined from sources such as well data, conceptualizations of geologic vertical cross-sections taken along the S-grid and vertical proportion graphs.

Horizontal or map facies proportion data is then calculated. Boundaries are defined on an areal "depocenter" map for each of the facies to create depocenter regions in which respective facies are likely to occur within the S-grid. Ideally, the boundaries for each of the facies are drawn sequentially and generally independently of one another. Typically, some of the depocenter regions will overlap one another. Horizontal or map facies proportion data for the columns of cells are then determined based on the boundaries of the depocenter regions. The proportion of each facies is smoothed across its associated boundary from a maximum value at a depocenter of a respective facies' depocenter region to a minimum value located laterally from that depocenter. The depocenter map may also include truncation regions in which particular facies may exist. Conversely, the particular facies may not exist in regions outside the truncation region.

A transition filter is ideally used to smooth or transition the horizontal facies proportion data from a maximum value at a depocenter to a minimum value. The transition filter can be used to define a specific lateral distance over which the relative likelihood of occurrence of a facies decays to zero away from a boundary of a depocenter region. Alternatively, a quantitative inversion of well data may be used to determine optimal parameters which control the transition filter.

The vertical and horizontal facies proportion data are then integrated to create a facies probability cube in which the cells are assigned probabilities for the occurrence of facies. Ideally, the integration uses a power law transformation. Such a transformation allows layers having 0% or 100% vertical proportion for a particular facies to remain, respectively, at 0% or 100%, after integration. The transformation allows layers having a vertical proportion between 0% and 100% for a particular facies to remain between 0% and 100%.

The method for building the facies probability cubes also may account for cases where there are dominant or else a minimal horizontal facies proportion for a column of cells. A user may define upper and lower thresholds for these facies proportions. In the event the proportion of a facies falls below or above the thresholds, the integration of the vertical and horizontal facies data will utilize specially developed weighted facies proportion data. This data accounts for the low or high probability of finding a particular facies in a column of cells.

A method for generating horizontal facies proportion data for a S-grid is also described. This data reflects the areal distribution of facies within the S-grid. The grid includes layers and columns of cells. Boundaries are defined-on an areal depocenter map to delineate depocenter regions in which respective facies are likely to occur within the S-grid. Ideally, these depocenter regions are estimated generally independently of one another to reduce the complexity that is otherwise incurred when trying to simultaneously account for the presence of all facies in a S-grid. Horizontal facies proportion data is generated for the columns of cells based on the defined boundaries of the depocenter regions with the proportion of each facies ranging from a maximum value at a depocenter of a respective facies depocenter region to a minimum value located laterally from the depocenter. Preferably, a transition filter is applied to a depocenter boundary to transition the facies probabilities from maximum to minimum values.

It is an object of the present invention to create an areal depocenter map which reflects the likelihood of the occurrence of facies in a S-grid wherein the proportion of a facies decreases from a maximum at a depocenter of a facies depocenter region to a minimum laterally spaced from the depocenter.

It is another object to use a transition filter to calculate horizontal facies proportion data from defined boundaries for depocenter regions wherein the transition filter can be readily changed so that multiple facies probabilities cubes can be quickly created and evaluated.

It is yet another object to utilize a power transformation law in an integration of vertical and horizontal facies proportion data so that layers having 0% to 100% vertical proportion of a particular facies will be maintained at those respective levels even after the integration.

It is a further object to provide maximum and minimum thresholds for facies proportions in a column cells wherein special vertical proportion data sets are used in an integration of vertical and horizontal facies data when the proportion of a facies falls below or exceeds those thresholds.

BRIEF DESCRIPTION OF THE DRAWINGS

These and other objects, features and advantages of the present invention will be better understood with regard to the following description, pending claims and accompanying drawings where:

FIGS. 4A–E, respectively, show a training image and facies geometrical parameters (map view shape, cross-section shape, dimensions, orientation and sinuosity) which are used to produce facies geobodies in the training image;

FIGS. 5A–C depict relationship/rules between facies that are used to build the training images;

FIGS. 6A–C illustrate vertical and horizontal constraints between facies;

FIGS. 15A–F show the smoothing of a depocenter region into graded probability curves using a pair of boxcar filters;

FIG. 18 shows a weighted vertical facies proportion graph.

DETAILED DESCRIPTION OF THE INVENTION

Figure 1:
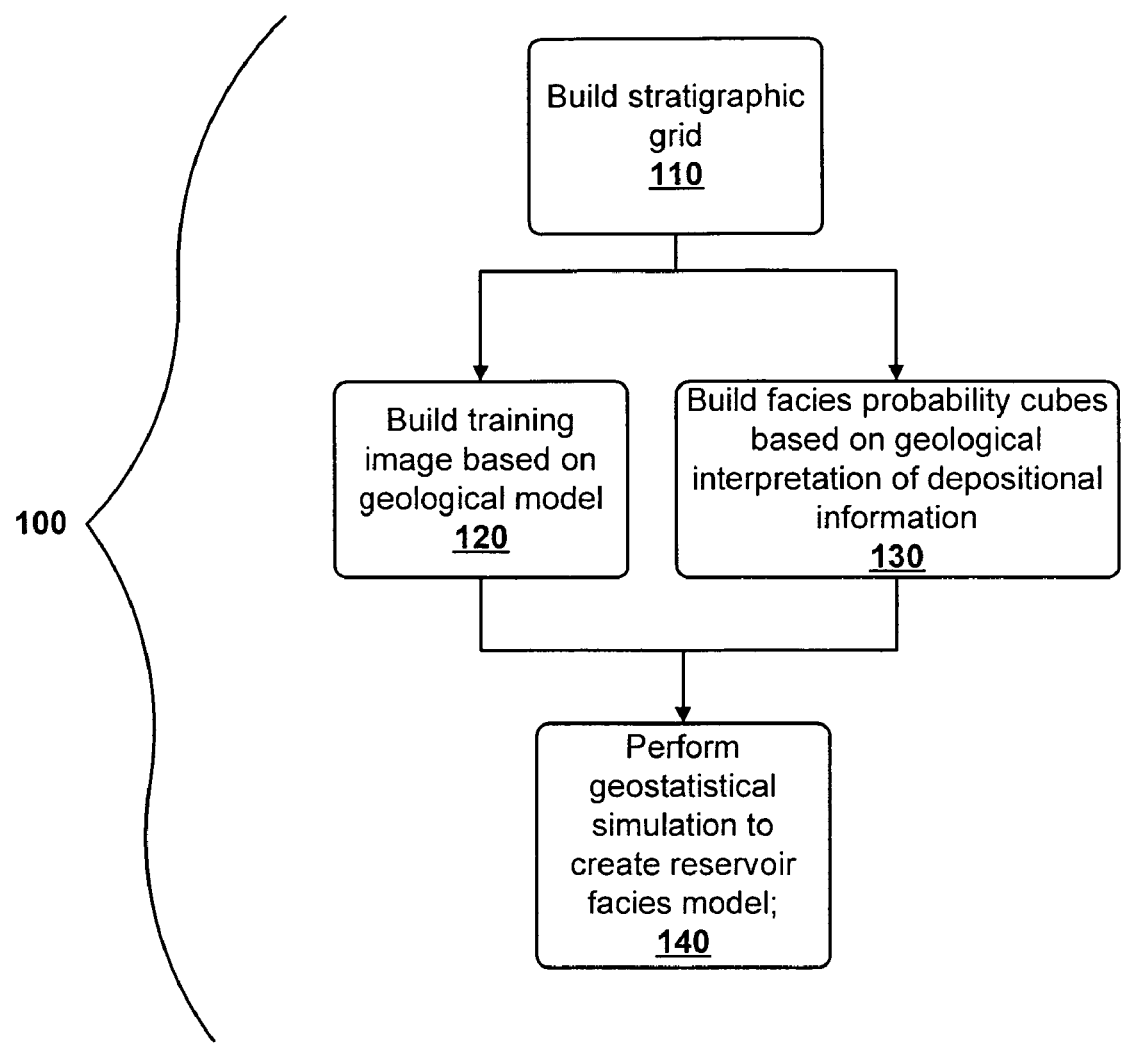
FIG. 1 is a flowchart describing a preferred workflow for constructing a reservoir facies model made in accordance with the present invention.

FIG. 1 shows a workflow 100, made in accordance with a preferred embodiment of the present invention, for creating a reservoir facies model. In particular, the workflow uses a training image, in conjunction with a geologically-interpreted facies probability cube as a soft constraint, in a geostatistical simulation to create a reservoir facies model.

A first step 110 in the workflow is to build a S-grid representative of a subsurface region to be modeled. The S-grid geometry relates to reservoir stratigraphic correlations. Training images are created in step 120 which reflect the interpreted geometry of each facies and the associations among facies. A geologically-interpreted facies probability cube is then created in step 130. This facies probability cube captures information regarding the absolute spatial distribution of facies in the S-grid based upon geologic depositional information and conceptualizations. The facies probability cube ideally honors local facies distribution information such as well data. A geostatistical simulation is performed in step 140 to create a reservoir facies model.

Figure 2:
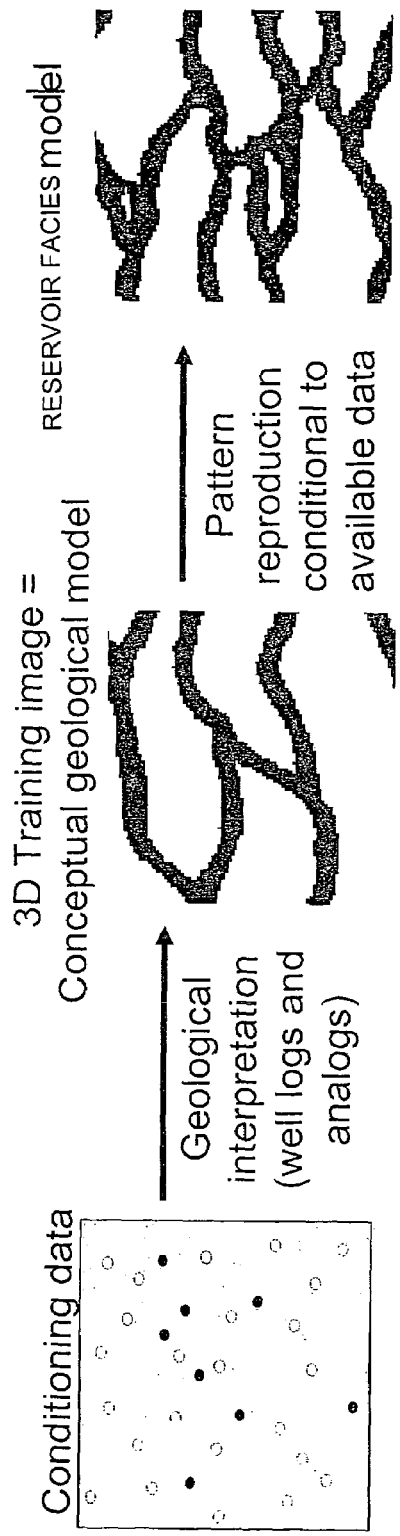
FIG. 2 shows how geological interpretation is used to create 3D training images which are then conditioned to available data to create a multiple-point geostatistics model.

FIG. 2 illustrates that conditioning data, such as well logs, as well as reservoir analogs, may be used in a geological interpretation to create the 3D training image or conceptual geological model. The reservoir facies model is generated by reproducing patterns of the aforementioned training image, preferably by way of the MPS simulation, while honoring the available conditioning data, in particular the well data and the geologically-interpreted facies probability cube.

I. Building a Training Image

A stratigraphic 3D grid (S-grid) comprising layers and columns of cells is created to model the subsurface region wherein one or more reservoirs are to be modeled. The S-grid is composed of penecontemporanous layers (layers deposited at the same time in geologic terms). The grid is built from horizons and faults interpreted from seismic information, as well as from well markers. A "training image," which is a 3D rendering of the interpreted geological setting of the reservoir, is preferably built within the S-grid used for modeling the reservoir. However, the training image can be also generated on a grid different from that S-grid. The training image is constructed based on stratigraphic input geometries that can be derived from well data, seismic interpretation, field analogs, outcrop data, or images hand drawn by a geologist.

Multiple-facies training images can be generated by combining objects according to user-specified spatial relationships between facies. Such relationships are based on depositional rules, such as the erosion of some facies by others, or the relative vertical and horizontal positioning of facies among each other.

Figure 3B:
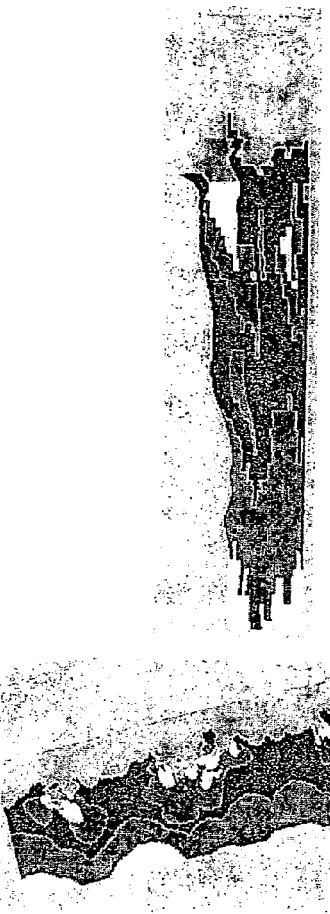
FIGS. 3A–B show respective slices and cross-sections through a 3D training image illustrating the geometrical characteristics and associations of estimated facies.
Figure 3A:
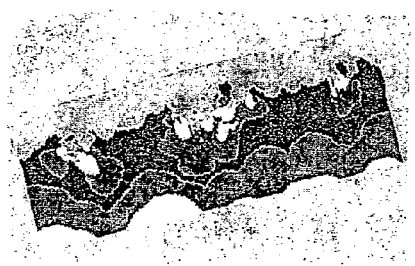

FIGS. 3A and 3B illustrate a training image horizontal section and a training image cross-section. The contrasting shades indicate differing facies types. The training images do not contain absolute (only relative) spatial information and need not be conditioned to wells.

A straightforward way to create training images, such as is seen in FIG. 4A, consists of generating unconditional object-based simulated realizations using the following two-step process. First, a geologist provides a description of each depositional facies to be used in the model, except for a "background" facies, which is often shale. This description includes the geometrical 3D shape of the facies geobodies, possibly defined by the combination of a 2D map shape and a 2D cross-section shape. For example, tidal sand bars could be modeled using an ellipsoid as the map view shape and a sigmoid as the cross-section shape, as shown in FIGS. 4B and 4C.

The dimensions (length, width, and thickness) and the main orientation of the facies geobodies, as illustrated in FIG. 4D, are also quantified. Instead of constant values, these parameters can be drawn from uniform, triangular or Gaussian distributions. FIG. 4E shows that sinuosity parameters, namely wave amplitude and wave length, may also be required for some types of facies elements such as channels.

Further, relationship/rules between facies are defined. For example, in FIG. 5A, facies 2 is shown eroding facies 1. In contrast, FIG. 5B shows facies 2 being eroded by facies 1. In FIG. 5C, facies 2 is shown incorporated within facies 1.

FIGS. 6A–C depict vertical and/or horizontal constraints. In FIG. 6A, there are no vertical constraints. Facies 2 is shown to be constrained above facies 1 in FIG. 6B. Finally, in FIG. 6C, facies 2 is constrained below facies 1.

Those skilled in art of facies modeling will appreciate that other methods and tools can be used to create facies training images. In general, these facies training images are conducive to being used in pixel-based algorithms for data conditioning.

II. Geologically-Interpreted Facies Probability Cube

A facies probability cube is created based upon geologic interpretations utilizing maps, logs, and cross-sections. This probability cube provides enhanced control on facies spatial distribution when creating a reservoir facies model. The facies probability cube is generated on the 3D reservoir S-grid which is to be used to create the reservoir facies model. The facies probability cube includes the probababil-ity of the occurrences of facies in each cell of the S-grid.

Figure 7:
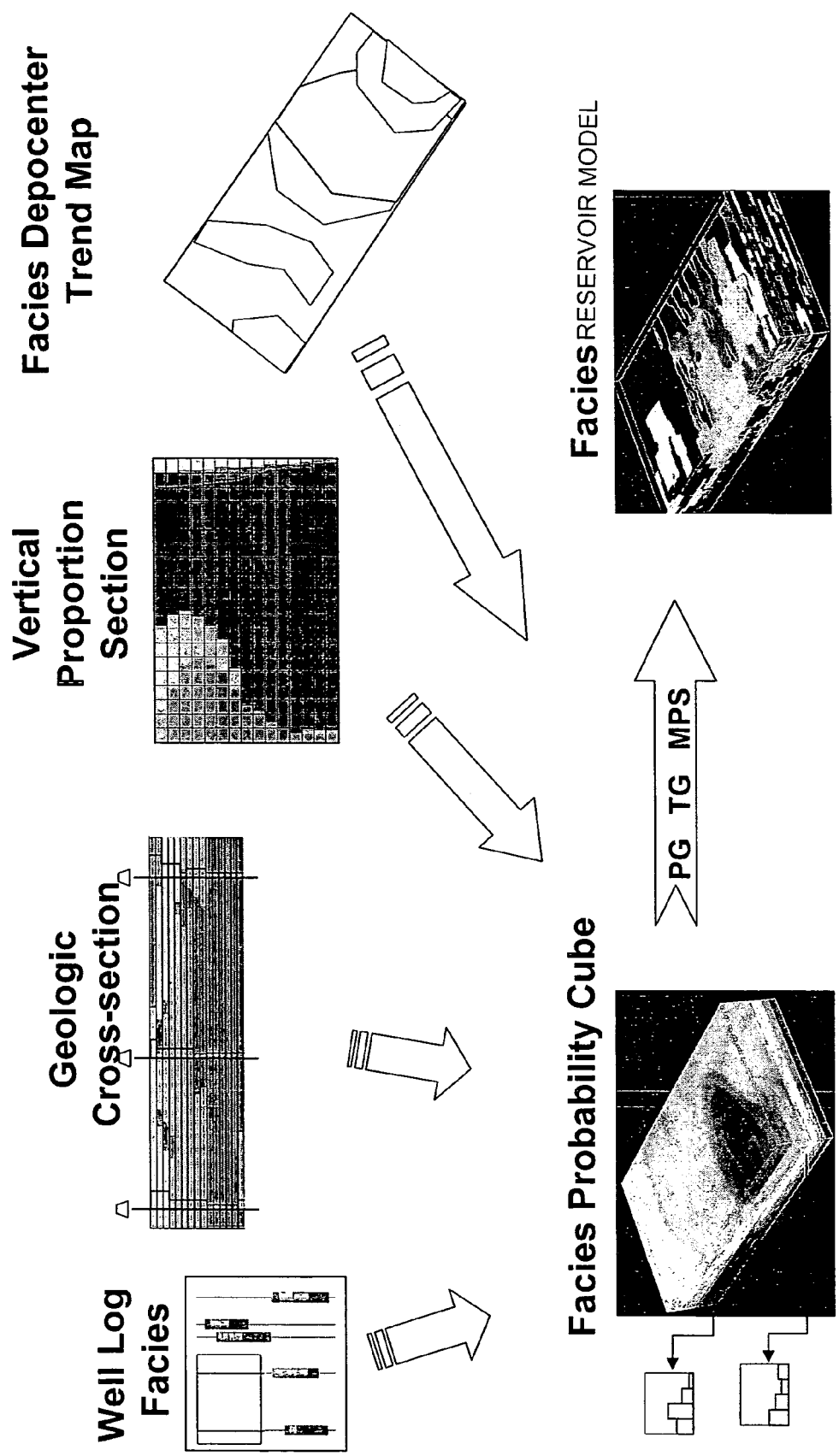
FIG. 7 is a schematic drawing of a facies distribution modeling technique used to create a geologically interpreted facies probability cube, and ultimately, a facies reservoir model.

FIG. 7 shows that the facies probability cube is created by combining facies proportion data gathered using vertical and horizontal or map sections. In this preferred exemplary embodiment, the vertical proportion data are derived from interpreted facies well logs, conceptual geologic cross-sections, and vertical proportion sections or graphs. Horizontal facies proportion data are derived using facies depocenter trend maps. Preferably, estimates of facies proportion data are generated from vertical and map view sections digitized by the modeler. These sections show facies trends that reflect facies knowledge from all available information including, but not limited to, data from well logs, outcrop data, cores, seismic, analogs and geological expertise for a particular stratigraphic interval. An algorithm is then used to combine the information from the vertical and horizontal proportion data to construct the facies probability cube. This facies probability cube, based largely on geological interpretation, can then be used in a geostatistical simulation to create a reservoir facies model.

Figure 8A:
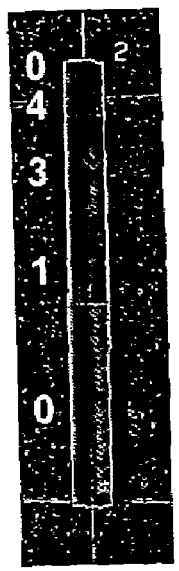
FIGS. 8A–B illustrate a series of facies assigned to a well and a corresponding facies legend.
Figure 8B:
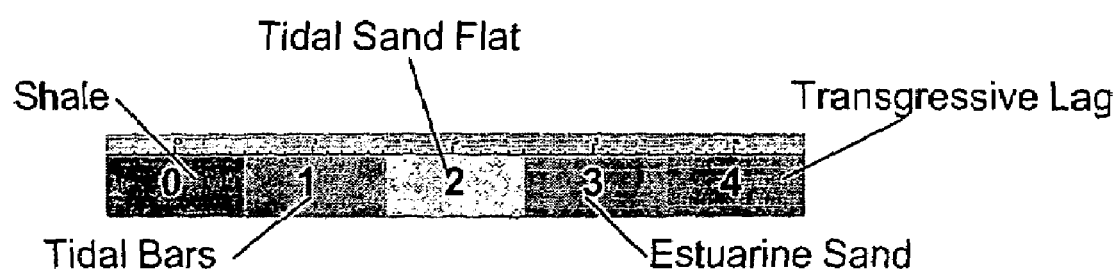

The number of facies types for the subsurface region to be modeled is ideally determined from facies well log data. Utilizing too many facies types is not conducive to building a 3D model which is to be used in a reservoir simulation. The number of facies types used in a facies probability cube ordinarily ranges from 2 to 9, and more preferably, the model will have 4 to 6 facies types. In an exemplary embodiment to be described below there are five facies types selected from facies well log data. FIGS. 8A and 8B show a well with assigned facies types and a corresponding legend bar. These exemplary facies types include: 1) shale; 2) tidal bars; 3) tidal sand flats; 4) estuarine sand; and 5) transgressive lag. Of course, additional or different facies types may be selected depending upon the geological settings of the region being modeled.

Facies types for known well locations are then assigned to appropriately located cells within the S-grid. Since well logs are generally sampled at a finer scale (~0.5 ft) than the S-grid (~2–3 ft), a selection can be made as whether to use the most dominant well facies data in a given cell, or the well facies data point closest to the center of the cell. To preserve the probability of thin beds, it may be preferable to select the facies data point closest to the center of the cell.

The next step in this exemplary embodiment is to create a vertical geologic cross-section which captures the conceptual image of what the depositional model of the field might look like. A section may be selected along any orientation of the S-grid. Commonly, this section is selected to intersect with as many of the wells as possible. The line used to create the section may be straight or may zigzag.

Figure 9A:
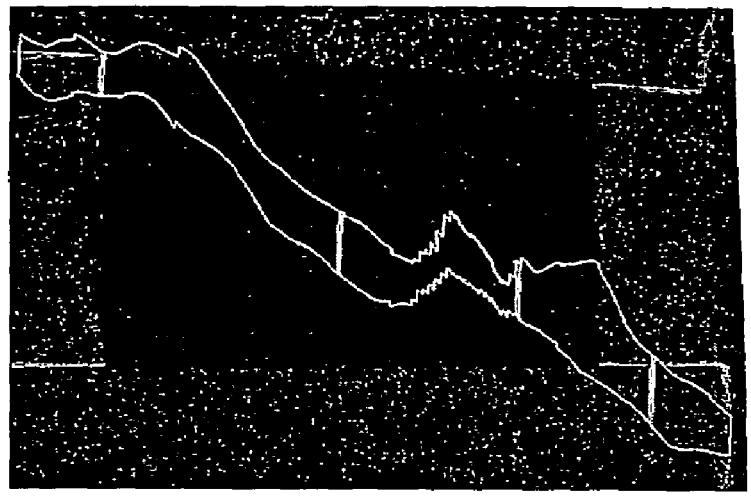
FIGS. 9A–B show an undulating vertical section taken from an S-grid with facies assigned to four wells located on the section and that section after being flattened.
Figure 9B:
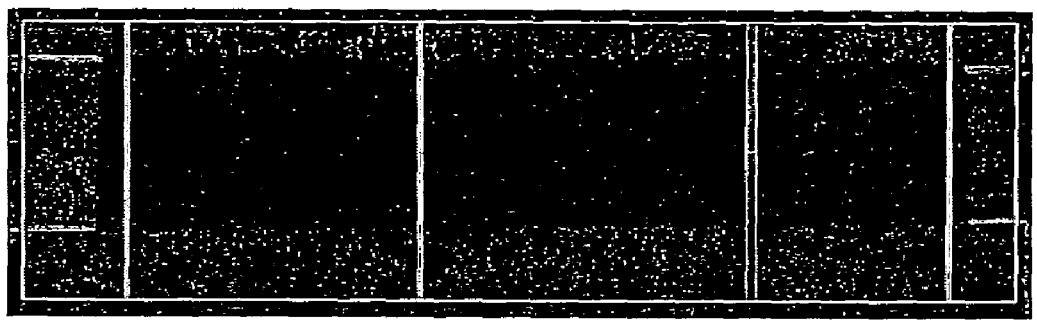

FIG. 9A illustrates an exemplary section with well facies data attached to the section. This particular section zigzags and intersects with four wells. The section can be flattened and straightened as seen in FIG. 9B. The flattened section makes the section easier to conceptualize and digitize. In particular, it may be desirable to flatten surfaces that are flooding surfaces. If a surface is erosional, then it may be preferable not to flatten the surface. In most cases, it is preferred to straighten the section.

Figure 10:
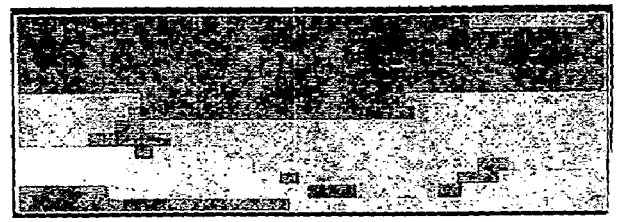
FIG. 10 shows polygons which are digitized on to a vertical section which is representative of a modeler's conception of the geologic presence of facies along that section.

Depositional polygons are digitized upon a vertical S-grid section to create a geologic cross-section as shown in FIG. 10. The polygons are representative of the best estimate of the location of geological facies geobodies on that section. Factors which should be taken into account in determining how to digitize the depositional polygons include an understanding of the depositional setting, depositional facies shapes, and the relationship among depositional facies.

Figure 11:
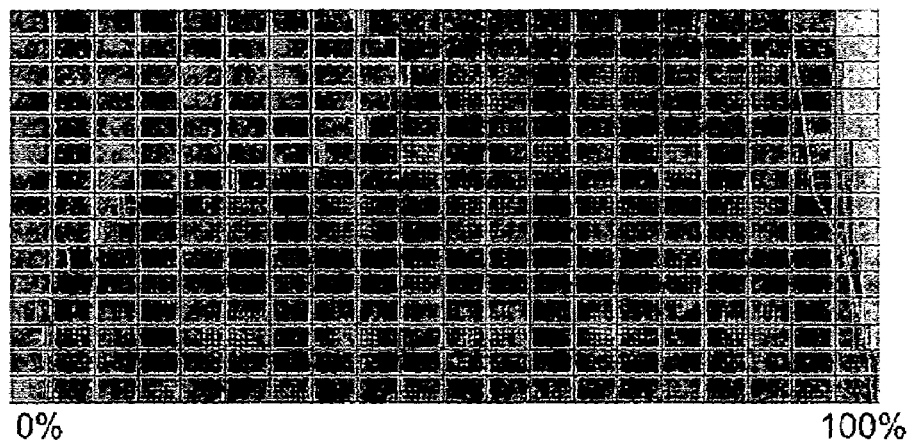
FIG. 11 is a vertical proportion graph showing estimates of the proportion of facies along each layer of a vertical section wherein the proportion on each layer adds up to 100%.

FIG. 11 shows a vertical "proportion section or graph" that specifies the expected percentage of each facies type for each layer. For each layer, all facies percentages add to 100%. This proportion section provides an idea of how the proportions of each facies type tends to change along the vertical.

Figure 12:
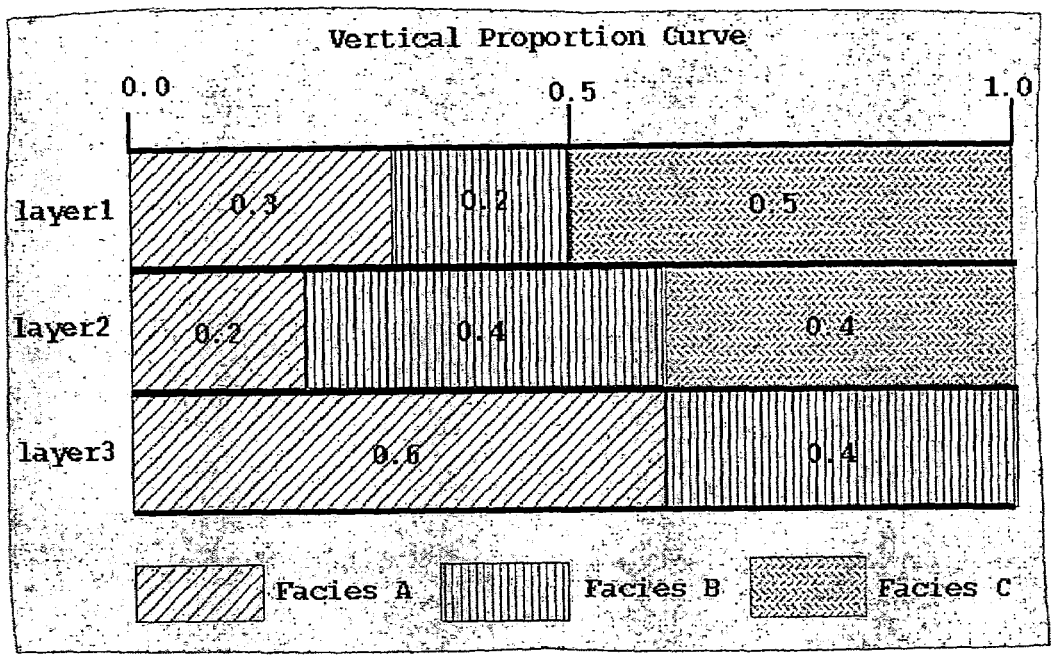
FIG. 12 shows an exemplary global vertical proportion graph.

An overall or composite vertical proportion graph/data is then created by combining the vertical proportion graphs computed using respectively the facies well log data, the digitized geological cross-sections, and the vertical proportion section. Each vertical proportion graph can be weighted in accordance with the certainty that that particular graph accurately represents the vertical facies trends or distributions of facies. For example, if a geological cross-section contains many wells and much well data, the corresponding vertical proportion graph may be given a relative high weighting. Conversely, if only one or two wells are available, the proportion graph computed from this well data may be given a low weighting. The weighted proportion graphs are then normalized to produce a composite vertical proportion graph wherein the proportion of facies adds up to 100% in each layer. A simple example of a vertical proportion graph is shown in FIG. 12.

Figure 13:
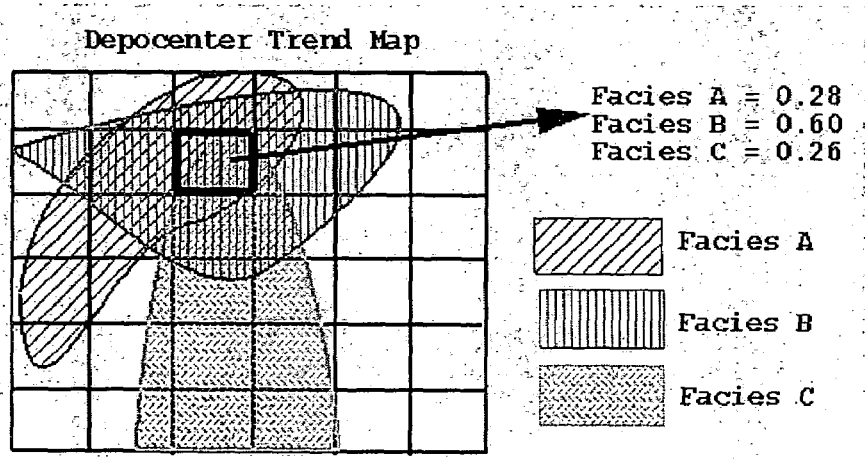
FIG. 13 illustrates a depocenter trend map containing overlapping facies depocenter regions.
Figure 14A:
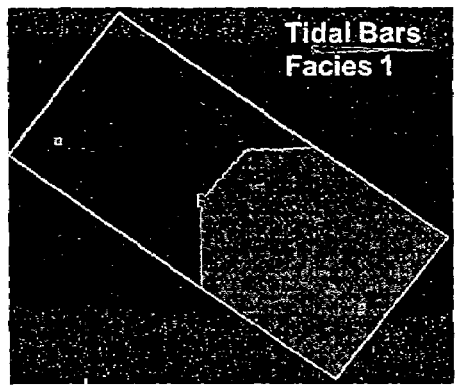
FIGS. 14A–D show digitized depocenter regions for four different facies which suggest where facies are likely to be found in an areal or map view of the S-grid.
Figure 14B:
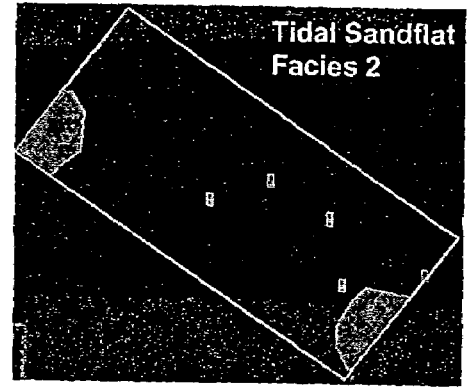
Figure 14C:
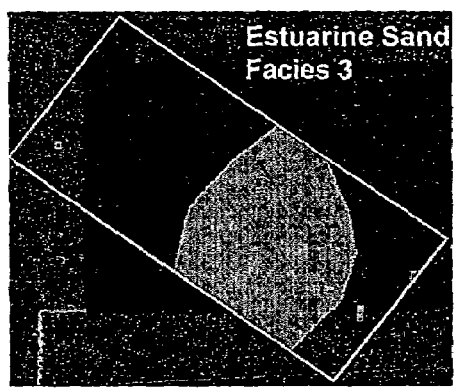
Figure 14D:
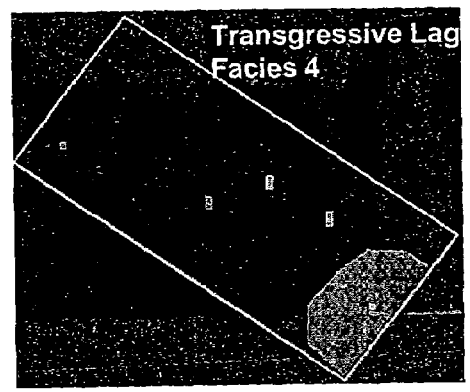

The next step is to create a depocenter map for each of the facies seen in FIG. 13. An areal 2D S-grid that matches the dimensions of the top layer of the 3D model S-grid is utilized to build the depocenter maps. One or more polygons are digitized on the 2D map to define a "depocenter region" likely containing a facies at some depth of the 3D S-grid. Depocenter regions do not need to be mutually exclusive but instead may overlap one another.

FIGS. 14A–D show the boundaries of four depocenter regions which have been digitized for four respective facies. A depocenter region can include the entire area of the map view, in which case no digitizing is necessary (this is referred to as background). In the central area of each polygon is a depocenter, which is the area beneath which one would expect the highest likelihood of the occurrence of a particular facies. A "truncation" region may also be digitized for each facies which defines an area beyond which that facies is not thought to be present. That is, facies cannot exist outside the defined truncation region for a respective facies.

Ideally, each of the depocenter regions is independently drawn through digitization. While some consideration may be given to the presence of other facies in the S-grid, ideally a modeler will focus primarily on where it is believed that a particular facies will occur in the map view. This simplifies the creation of the combined overlapping depocenter map as shown in FIG. 13.

In contrast, conventional horizontal trends maps often rely upon simultaneously drawing and accounting for all the facies on a single horizontal section. Or else, conventionally simultaneous equations may be developed which describe the probability distribution of the facies across the horizontal map. The thought process in creating such horizontal trend maps is significantly more complex and challenging than individually focusing on creating depocenter maps for each individual facies.

FIGS. 15A–F show a depocenter region which has been smoothed using a transition filter to distribute the probability of a facies occurring in columns of cells from a maximum to a minimum value. As shown in FIG. 15A, curve lines can be drawn to illustrate the relative level of probabilities as they decrease away from a depocenter. A shaded depocenter region is shown at the center of the map.

In this particular exemplary embodiment, a boxcar filter is used as the transition filter. Those skilled in the art will appreciate that many other types of filters or mathematical operations may also be used to smooth the probabilities across the depocenter region and map section. Probabilities decay away from the center region depending on the filter selected. A filter number of two requires the facies probabilities decay to 0% two cells from the edge or boundary of a digitized depocenter region, as seen in FIGS. 15B and 15D. Similarly, selecting a filter number of 4 will cause decay from a boundary to 0% over four cells, as illustrated in FIGS. 15C and 15E. A filter number of 4–2 can be used to average the results of using the average of the output from the number 4 filter and the number 2 filter. FIG. 13 shows values (0.28, 0.60 and 0.26) for a particular column of cells after filtering operation have occurred on depocenter region for facies A, B and C. Note the values are not normalized, i.e., they need not add up to 1.C. The use of such transition filters enables a modeler to rapidly produce a number of different depocenter maps. The modeler simply changes one or more filter parameters to create a new depocenter map. Accordingly, a modeler can, by trial and error, select the most appropriate filter to create a particular facies depocenter map. The resulting depocenter map ideally will comport with facies information gathered from well log data as well as other sources of facies spatial distribution information.

In another embodiment of this invention, an objective function can be used to establish which filter should be used to best match a depocenter map to known well facies data. A number of different filters can be used to create depocenter maps for a particular facies. The results of each depocenter map are then mathematically compared against well facies data. The filter which produces the minimum discrepancy between a corresponding depocenter map and the well log facies data is then selected for use in creating the facies probability cube.

In general, the areal depocenter trend map and data account for the likelihood of the occurrence of facies along columns or depth of the S-grid (See FIG. 13). In contrast, the vertical proportion graph/data relates to the likelihood that a facies will exist on some layer (See FIG. 12). The tendencies of a facies to exist at some (vertical) layer and in some (areal) depocenter region are combined to produce an overall estimate of the probabilities that a facies exists in each cell of the S-grid. A preferred algorithm will be described below for combining the vertical proportion data and the map or horizontal proportion data to arrive at an overall facies probability cube for the S-grid.

There are preferred constraints on this process. If a vertical proportion graph indicates that there should be 100% of a facies in a layer, or 0% facies in a layer, that value should not change when overall cell probabilities are calculated. A preferred process to accomplish this goal is to use a power law transformation to combine the vertical and horizontal (map) proportion data. The power transformation law used in this example comports with the follow equation:

$$\frac{\sum_{l=1}^{N}[V_f(l)]^{w(l)}}{N} = P_f \qquad (1)$$

where l = a vertical layer index;

$V_f(l)$ = proportion of a facies f in layer l;

$P_f$ = average probability for a facies f in a column of cells;

w(l) = a power exponential; and

N = number of layers in the S-grid.

The following simplified example describes how the vertical and horizontal facies data are integrated. FIG. 12 illustrates a simple vertical proportion graph with three types of facies (A, B, and C). Note that the S-grid consists of three layers (N=3) and each layer has proportions ($V_f$) of facies A, B, and C.

The corresponding depocenter trend map is depicted in FIG. 13. Boundaries are drawn to establish initial depocenter regions for facies A, B and C. Subsequently, the smoothing of probabilities of facies A, B and C across the depocenter boundaries is performed using a filter, such as a boxcar filter. For the column of cells under consideration at a map location (x,y), the probabilities ($P_f$) for the existence of facies A, B and C are determined to be 0.28, 0.60, and 0.26, respectively. These values from a filtering operation are not normalized in this example.

Based on the power transformation law of Equation (1) above, the following three equations are created for the three facies:

$$\frac{0.3^{w1} + 0.2^{w1} + 0.6^{w1}}{3} = 0.28$$

$$\frac{0.2^{w2} + 0.4^{w2} + 0.4^{w2}}{3} = 0.60$$

$$\frac{0.5^{w3} + 0.4^{w3} + 0}{3} = 0.26$$

The equations are solved to provide $w_1$=1.3, $w_2$=0.45, and $w_3$=1.2.

The facies proportions are then computed along that column for each cell on a layer by layer basis.

| Layer | Facies A | Facies B | Facies C |
|---|---|---|---|
| 1 | $0.3^{1.3}$ | $0.2^{1.3}$ | $0.5^{1.3}$ |
| 2 | $0.2^{0.45}$ | $0.4^{0.45}$ | $0.4^{0.45}$ |
| 3 | $0.6^{1.2}$ | $0.4^{1.2}$ | 0.0 |

This results in the following values:

| Layer | Facies A | Facies B | Facies C |
|---|---|---|---|
| 1 | 0.209 | 0.123 | 0.406 |
| 2 | 0.485 | 0.662 | 0.662 |
| 3 | 0.542 | 0.333 | 0.000 |

After normalization, the facies proportions at each cell are:

| Layer | Facies A | Facies B | Facies C |
|---|---|---|---|
| 1 | 0.283 | 0.167 | 0.550 |
| 2 | 0.268 | 0.366 | 0.366 |
| 3 | 0.619 | 0.381 | 0.000 |

This process is repeated to determine the facies probabilities in all the cells of S-grid.

Special Vertical Proportion Graphs

In certain instances the proportion of a facies in a column of cells may be significantly different from the proportion of that facies in a layer of cells. This disparity in proportions may occur if one or more facies is either dominant or minimal in a column of cells. In such cases, special weighted vertical proportion graphs can be used in calculating cell probabilities to provide a better correlation between vertical and horizontal proportion data for that column of cells.

A user ideally defines dominant and minimal threshold facies-proportion limits for the columns of cells. For example, a user may specify that a column of cells has a dominant facies A if 90% or more of cells in that column contains facies A. Also, a user may specify a minimal facies threshold proportion limit, i.e., 15% or less. Alternatively, the dominant and minimal thresholds may be fixed in a computer program so that a user does not have to input these thresholds.

Figure 16A:
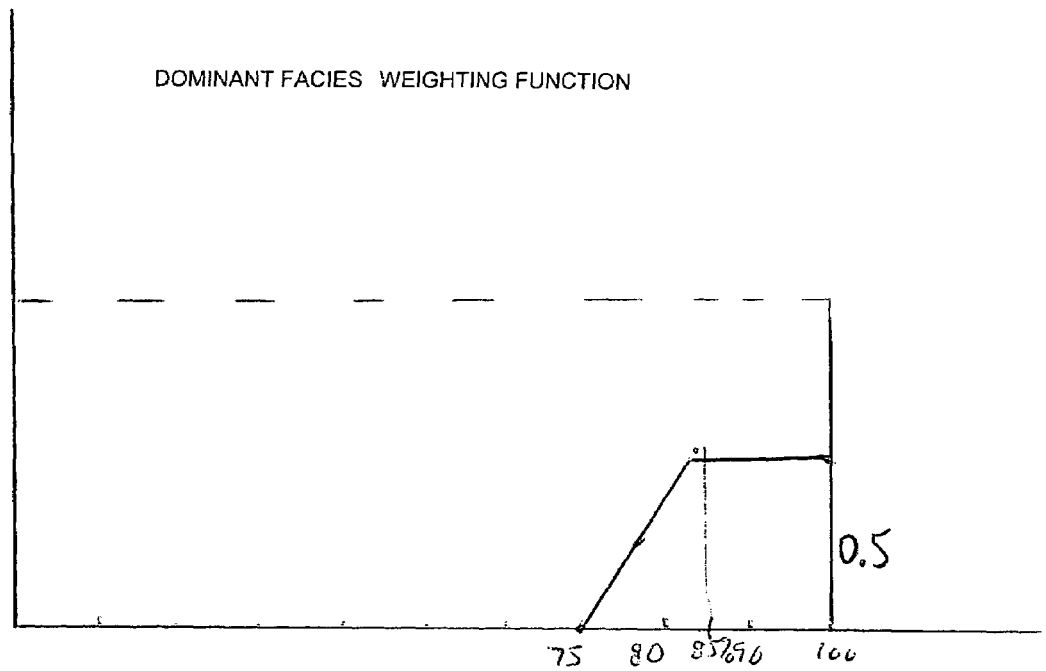
FIGS. 16A–B show dominant and minimal weighting graphs used in creating weighted vertical facies proportion graphs.
Figure 16B:
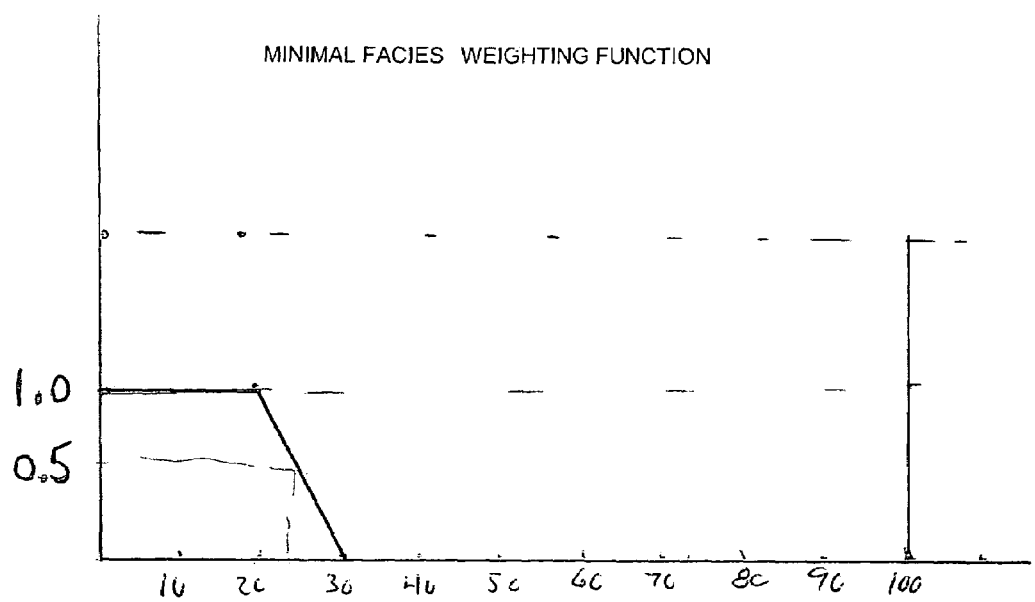
Figure 17:
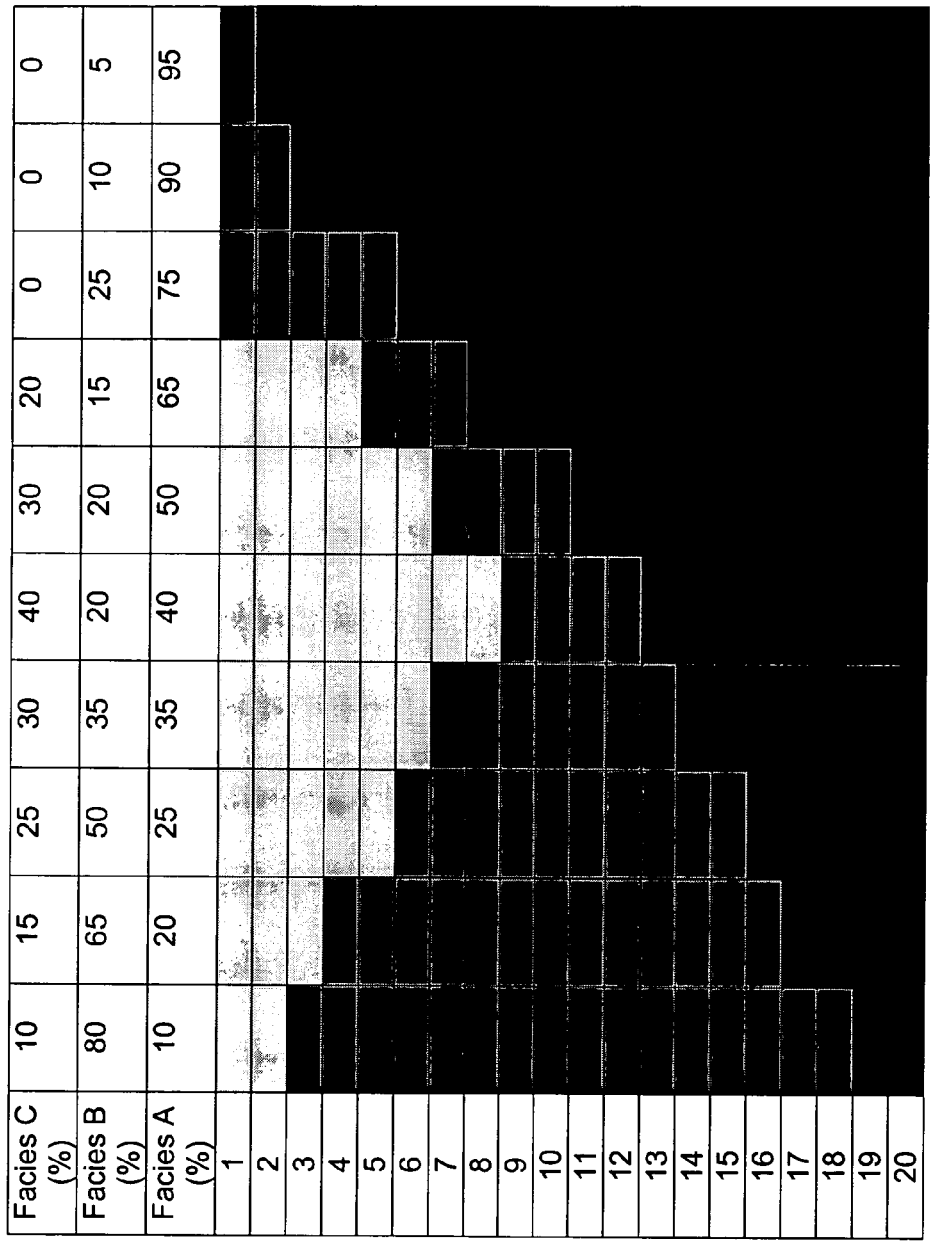
FIG. 17 shows a vertical cross-section of an S-grid used in creating the weighted vertical facies proportion graph.

The special weighted vertical-proportion graphs/data are created by using weighting functions to modify the proportions of a vertical section. Examples of such weighting functions are seen in FIGS. 16A–B. FIG. 16A shows a weighting function for use with dominant facies and FIG. 16B illustrates an exemplary weighting function for use with minimal facies. The vertical section may be a conceptual geologic cross-section, such as shown in FIG. 17.

Ideally, weighted vertical proportion graphs are created for each of the minimal and dominant facies. For the section shown in FIG. 17, minimal and dominant weighted proportion graphs are created for each of facies A, B and C for a total of six weighted proportion graphs. The construction of a minimal weighted proportion graph for facies A will be described below. This exemplary resulting proportion graph is shown in FIG. 18. The other proportion graphs are not shown but can be constructed in a manner similar to that of the proportion graph of FIG. 18.

Weighting functions are first defined and are shown in FIGS. 16A–B. In FIG. 16A, a dominant weighting function is shown that linearly ramps up from a value of 0.0 at 75% to a value of 1.0 at 85–100%. Weights are selected from the weighting function based upon the percentage of the particular facies found in each column of the vertical section for which the facies-weighted proportion graph is to be constructed. For example, if the weighted proportion graph is to be constructed for facies A, then the percentage of facies A in each column will control the weight for that column.

FIG. 16B shows a weighting function for use with columns of cells having a minimal presence of a facies. In this case, a weight of 1.0 is assigned when the percentage of facies A in a column is from 0–20% and linearly declines to a value of 0.0 at 30%. Preferably, the weighting functions include a ramp portion to smoothly transition between values of 0.0 and 1.0. Of course, the aforementioned linear ramping portions of the weighting functions could also be non-linear in shape if so desired.

Weights from the weighting functions are applied to the proportion of the facies in the cells in each layer of the vertical section. The sum of the weighted proportions is then divided by the sum of the weights to arrive at a weighted facies proportion for a layer. More particularly, the facies are calculated according to the following equation:

$$\frac{\sum w_c \cdot f_i}{\sum w_c} = V_f(l) \quad (2)$$

where
  $w_c$=weight for a particular column of cells;
  $f_i$=1.0 where a facies f is present in a cell;
  =0.0 where a facies f is not present in a cell;
  $\Sigma w_c$=sum of the weights in a layer of cells; and
  $V_f(l)$=proportion of a facies in a layer.

An example of how to determine proportion values for constructing a weighted proportion graph will be now be described. Looking to the first column of the vertical section in FIG. 17, the percentage of facies A in column 1 is 10%. Referring to the weighting graph of FIG. 16B, as 10% fall within the 20% threshold, a weight of 1.0 is assigned to this column. In column 2, the overall percentage of facies A is 20%. Again, this falls within the threshold of 20% so a full weight of 1.0 is assigned to column 2. In column 3, the percentage of facies A is 25%. The value of 25% falls within the linearly tapered region of the weighting function. Accordingly, a corresponding weight of 0.5 is selected for cells in column 3. For column 4, the percentage of facies A is 35%. As 35% is beyond the threshold of 30%, a weight of 0.0 is assigned to column 4. The remaining columns all contain in excess of 30% of facies A. Accordingly, all these columns are assigned a weight of 0.0. Therefore, only the first three columns are used in creating the vertical proportion graph for use when a minimal proportion of facies A is found in a column of cells from the depocenter map.

The weights for columns 1, 2 and 3, respectively, 1.0, 1.0 and 0.5, will be multiplied by the proportion of the facies in each cell. As each cell is assigned only one facies, the proportion will be 1.0 when a particular facies is present and 0.0 when that facies is not present. The following are exemplary calculations of facies proportion for several layers using Equation (2).

Layers 20 and 19, facies A:

(1.0×1.0+1.0×1.0+0.5×1.0)/(1.0+1.0+0.5)=1.0

Layers 20 and 19, facies B and C:

(1.0×0.0+1.0×0.0+0.5×0.0)/2.5=0.0

Layers 18 and 17, facies A:

(1.0×0.0+1.0×1.0+0.5×1.0)/2.5=0.6.

Layers 18 and 17, facies B:

(1.0×1.0+1.0×0.0+0.5×0.0)/2.5=0.4

Layers 18 and 17, facies C:

(1.0×0.0+1.0×0.0+0.5×0.0)/2.5=0.0

Layer 16, facies A:

(1.0×0.0+1.0×0.0+0.5×1.0)/2.5=0.2

Layer 16, facies B:

(1.0×1.0+1.0×1.0+0.5×0.0)/2.5=0.8

Layer 16, facies C:

(1.0×0.0+1.0×0.0+0.5×0.0)/2.5=0.0

Layer 3, facies A:

(1.0×0.0+1.0×0.0+0.5×0.0)/2.5=0.0

Layer 3, facies B:

(1.0×1.0+1.0×0.0+0.5×0.0)/2.5=0.4

Layer 3, facies C:

(1.0×0.0+1.0×1.0+0.5×1.0)/2.5=0.6

These calculations are carried out until the all the proportions for facies A, B and C are calculated for all the layers to create the weighted proportion graph for minimal facies A which is shown in FIG. 18. The process is repeated to create the other five weighted proportion graphs. These graphs will again use weights from the minimal and dominant weighting functions, determined from the percentages of the appropriate facies in the columns of the vertical section, which are then multiplied by the facies proportions in the cells and divided by the sum of the weights. Again, vertical proportion values from these specially weighted proportion graphs will be used with Equation (1) to calculate cell probabilities for the facies probability cube.

The modeling of uncertainty in the spatial distribution of facies in an S-grid can be accomplished by changing geologic assumptions. For example, differing geological sections could be digitized to reflect different theories on how the geologic section might actual appear. Alternatively, different versions of the vertical proportion graph could be created to capture differing options about how the facies trends change from layer to layer across the S-grid. Similarly, a variety of differing depocenter maps could be used to capture the uncertainty in the distribution of facies in a map view of the S-grid. Further, different filters could be applied to depocenter regions to create alternative horizontal facies data, and ultimately, facies probability cubes.

III. Creating a Reservoir Facies Model Utilizing Training Images and Geologically Derived Facies Probability Cubes The present invention segments geologic knowledge or information into a couple of distinct concepts during reservoir facies modeling. First, the use of training images captures facies information in terms of facies continuity, association, and heterogeneity. Second, using facies probability cubes which are generated using conceptual geologic estimates or interpretations regarding depositional geology enhances the relative connectivity and spatial knowledge regarding facies present in a reservoir facies model.

Uncertainty may be accounted for in the present invention by utilizing a single facies probability cube in combination with several different training images which can be built based upon uncertainties in facies continuity, association, and heterogeneities. Conversely, numerous MPS simulations can be conducted using a single training image and numerous facies probability cubes which were generated using different geologic concepts as to the spatial distribution of the facies in a S-grid. Hence, uncertainty primarily related to facies continuity, association, and heterogeneities can be captured using a variety of training images while uncertainties primarily associated with the absolute spatial distribution of those facies in the S-grid model can determined through using multiple facies probability cubes.

Reservoir facies models in this preferred embodiment are made in a manner comparable with that described by Caers, J., Strebelle, S., and Payrazyan, K., *Stochastic Integration of Seismic Data and Geologic Scenarios: A West Africa Submarine Channel Saga,* The Leading Edge, March 2003. As provided above, this paper describes how seismically derived facies probability cubes can be used to further enhance conventional MPS simulation in creating reservoir facies models. The present invention utilizes geologically derived facies probability cubes as opposed to using seismically derived facies probability cubes. This provides the advantage of integrating geological information from reservoir analogues and removing seismic data artifacts.

The training image and the geologically derived facies probability cube are used in a geostatistical simulation to create a reservoir facies model. The preferred geostatistical methodology to be used in the present invention is multiple point statistics simulation (or MPS). It is also within the scope of this invention to use other geostatistical methodologies in conjuction with training images and geologically derived facies probability cubes to construct reservoir facies models having enhanced facies distributions and continuity.

The multiple-point geostatistical simulation program SNESIM (Single Normal Equation Simulation) is preferably used to generate facies models that reproduce the facies patterns displayed by the training image, while honoring the hard conditioning well data. SNESIM uses a sequential simulation paradigm wherein the simulation grid cells are visited one single time along a random path. Once simulated, a cell value becomes a hard datum that will condition the simulation of the cells visited later in the sequence. At each unsampled cell, the probability of occurrence of any facies A conditioned to the data event B constituted jointly by the n closest facies data, is inferred from the training image by simple counting: the facies probability P(A|B), which identifies the probability ratio P(A,B)/P(B)according to Bayes' relation, can be obtained by dividing the number of occurrences of the joint event {A and B} P(A,B)) by the number of occurrences of the event B(P(B)) in the training image. A facies value is then randomly drawn from the resulting conditional facies probability distribution using Monte-Carlo simulation, and assigned to the grid cell. Monte-Carlo sampling process is well-known to statisticians. It consists of drawing a random value between 0 and 1, and selecting the corresponding quantile value from the probability distribution to be sampled.

SNESIM is well known to those skilled in the art of facies and reservoir modeling. In particular, SNESIM is described in Strebelle, S., 2002, *Conditional Simulation of Complex Geological Structures Using Multiple-Point Statistics:* Mathematical Geology, V. 34, No. 1; Strebelle, S., 2000, Sequential Simulation of Complex Geological Structures Using Multiple-Point Statistics, doctoral thesis, Stanford University. The basic SNESIM code is also available at the website http://pangea.stanford.edu/~strebell/research.html. Also included at the website is the PowerPoint presentation senesimtheory.ppt which provides the theory behind SNESIM, and includes various case studies. PowerPoint presentation senesimprogram.ppt provides guidance through the underlying SNESIM code. Again, these publications are well-known to facies modelers who employ multiple point statistics in creating facies and reservoir models. These publications are hereby incorporated in there entirety by reference.

The present invention extends the SNESIM program to incorporate a geologically-derived probability cube. At each unsampled grid cell, the conditional facies probability P(A|B) is updated to account for the local facies probability P(A|C) provided by the geologically-derived probability cube. That updating is preferably performed using the permanence of ratios formula described in Journel, A. G., 2003, p. 583, *Combining Knowledge From Diverse Sources: An Alternative to Traditional Data Independence Hypotheses*, Mathematical Geology, Vol. 34, No. 5, July 2002, p. 573–596. The teachings of this reference is hereby incorporated by reference in its entirety.

Consider the logistic-type ratio of marginal probability of A:

$$a = \frac{1 - P(A)}{P(A)}$$

Similarly $$b = \frac{1 - P(A \mid B)}{P(A \mid B)}, c = \frac{1 - P(A \mid C)}{P(A \mid C)}, x = \frac{1 - P(A \mid B, C)}{P(A \mid B)}$$

where

P(A|B, C)=the updated probability of facies A given the training image information and the geologically-derived facies probability cube.

The permanence of ratio amounts to assuming that:

$$\frac{x}{b} \cong \frac{c}{a}$$

As described by Journel, this suggests that "the incremental contribution of data event C to knowledge of A is the same after or before knowing B."

The conditional probability is then calculated as $$P(A \mid B, C), = \frac{1}{1 + x} = \frac{a}{a + bc} \in [0, 1]$$

One advantage of using this formula is that it prevents order relation issues: all the updated facies probabilities P(A|B, C) are between 0 and 1, and they sum up to 1. A facies is then randomly drawn by using a Monte-Carlo simulation from the resulting updated facies probability distribution to populate the cells of the S-grid.

The end result is a reservoir facies model where each facies can be then populated with properties such as as porosity, permeability, and water saturation. Such a reservoir model may then be used with a reservoir simulator. Such commercial reservoir simulators include Schlumberger's ECLIPSE® simulator, or ChevronTexaco CHEARS® simulator.

While in the foregoing specification this invention has been described in relation to certain preferred embodiments thereof, and many details have been set forth for purposes of illustration, it will be apparent to those skilled in the art that the invention is susceptible to alteration and that certain other details described herein can vary considerably without departing from the basic principles of the invention.

What is claimed is:

1. A method for creating a facies probability cube comprising the steps of:
   generating a S-grid which is representative of a subsurface volume containing facies, the grid including layers of cells and columns of cells;
   determining vertical facies proportion data for the layers of cells;
   defining boundaries on an areal depocenter map to create depocenter regions in which respective facies are likely to occur within the S-grid;
   determining horizontal facies proportion data for the columns of cells utilizing the boundaries of the depocenter regions so that the proportion for each facies ranges from a maximum value at a facies depocenter for each respective depocenter region to a minimum value located laterally from the facies depocenter; and
   integrating the vertical facies proportion data with the horizontal facies proportion data to create a facies probability cube in which the cells are assigned probabilities for the occurrence of facies.

2. The method of claim 1 wherein:
the depocenter map includes at least one truncation region outside of which a particular facies cannot exist.

3. The method of claim 1 wherein:
the vertical facies proportion data is determined from at least one of well data, a conceptual geological section and a vertical proportion graph.

4. The method of claim 1 wherein:
the vertical proportion data is a weighted average of data derived from at least two of well data, a conceptual geological section and a vertical proportion graph.

5. The method of claim 1 wherein:
the vertical facies proportion data is determined from a vertical conceptual geological section.

6. The method of claim 1 wherein:
the boundaries defining the depocenter regions are independently mapped for each of the facies.

7. The method of claim 1 wherein:
a transition filter is used to transition horizontal facies proportion data from a maximum value at a depocenter to a minimum value.

8. The method of claim 7 wherein:
the transition filter is a boxcar filter.

9. The method of claim 7 wherein:
the transition filter defines the lateral distance over which the relative likelihood of occurrence of a facies decays to zero away from a depocenter boundary.

10. The method of claim 8 wherein:
the transition filter is controlled by parameters determined from a quantitative inversion of well data.

11. The method of claim 1 wherein:
a dominant fraction limit is defined for the horizontal facies proportion data; and
the integration of the vertical and horizontal facies proportion data into probabilities for the cells depends at least partially upon weighted vertical facies proportion data produced using weighted column analysis.

12. The method of claim 11 wherein:
the weighted column analysis uses a weighting graph having an upper threshold and a lower threshold.

13. The method of claim 12 wherein:
the weighting graph includes a transition region to reflect the gradual decrease in weighting from 1.0 to 0.0.

14. The method of claim 1 wherein:

a power transformation law is used in the integration of the vertical and horizontal data.

15. The method of claim 14 wherein:

the power transformation law comports with the follow equation:

$$\frac{\sum_{l=1}^{N}[V_f(l)]^{w(l)}}{N}=P_f$$

where l=a vertical layer index;

$V_f(l)$=proportion of a facies f in layer l;

$P_f$=average probability for a facies f in a column;

w(l)=a power exponential; and

N=number of layers in the S-grid.

16. A method for creating an areal depocenter map for identifying the distribution of facies within a S-grid comprising:

generating a S-grid which is representative of a subsurface volume containing facies, the grid including layers of cells and columns of cells;

defining boundaries on an areal depocenter map of the S-grid to create depocenter regions in which respective facies are likely to occur within the S-grid; and determining horizontal facies proportion data for the columns of cells based on the defined boundaries of the depocenter regions so that the proportion of each facies ranges from a maximum value a depocenter of each respective facies depocenter region to a minimum value located laterally from that depocenter.

* * * * *